United States Patent [19]

Butler

[11] Patent Number: 6,102,978
[45] Date of Patent: Aug. 15, 2000

[54] AIR FILTER CONFIGURATION WITH PREFORMED METAL COIL SURROUNDING A PLEATED AIR FILTER ELEMENT

[75] Inventor: P. Gregory Butler, Oklahoma City, Okla.

[73] Assignee: Dana Corporation, Toledo, Ohio

[21] Appl. No.: 09/028,002

[22] Filed: Feb. 23, 1998

[51] Int. Cl.[7] ............................ B01D 27/06; B01D 29/21
[52] U.S. Cl. ................... 55/492; 55/498; 55/499; 55/501; 55/510; 55/DIG. 5; 156/69; 156/556
[58] Field of Search ............................ 55/492, 498, 499, 55/501, 302, 510, 524, DIG. 5; 95/273, 280, 283; 210/493.5, 485; 156/423, 556, 559, 69

[56] References Cited

U.S. PATENT DOCUMENTS

| | | |
|---|---|---|
| 2,185,584 | 1/1940 | Boyce . |
| 2,951,553 | 9/1960 | Kirby . |
| 3,016,984 | 1/1962 | Getzin ........................................ 55/492 |
| 3,417,551 | 12/1968 | Bonell . |
| 4,120,711 | 10/1978 | Gudeman .................................. 156/69 |
| 4,322,231 | 3/1982 | Hilzendeger et al. ..................... 55/498 |
| 4,652,285 | 3/1987 | Greene . |
| 5,248,162 | 9/1993 | Levosinski et al. ....................... 55/498 |

*Primary Examiner*—David A. Simmons
*Assistant Examiner*—Robert A. Hopkins
*Attorney, Agent, or Firm*—Millen, White, Zelano & Branigan

[57] ABSTRACT

A filter element which includes an annular filter media is surrounded by an external wrap in the form of preformed metal coil instead of a standard metal sleeve. The preformed metal coil has end portions in the form of circular hoops which are retained by adhesive, which adhesive is used to both seal the ends of the filter media and to retain end caps in place on the filter media. The preformed metal coil is of specific use with filter elements that are cleaned by back pulsing in industrial facilities, but is used in any situation where standard metal external sleeves are now used for filter elements.

8 Claims, 2 Drawing Sheets

AIR FILTER CONFIGURATION WITH PREFORMED METAL COIL SURROUNDING A PLEATED AIR FILTER ELEMENT

FIELD OF THE INVENTION

The present invention is directed to air filter configurations. more particularly, the present invention is directed to air filter configurations in which a filter media forming part of an air filter element is surrounded by an external protective or supporting structure.

BACKGROUND OF THE INVENTION

Typically, filter elements are comprised of a filter media which separates particles from a stream of fluid and support structure for the filter media. More specifically, air filters which utilize pleated annular filter media have an internal supporting tube with perforations or holes therethrough which fits in the hollow core of the filter media and provides an internal support. In addition, end caps are provided which fit over radially extending axial ends of the filter media and are held in place by end cap adhesive, which adhesive also seals the space between panels forming the pleats of the filter media. When air flows from outside the filter media to the hollow core of the filter media, the perforated tube, which may be expanded metal, supports the filter media and keeps the filter media from collapsing. The end caps and end cap adhesive close the pleats so that air does not bypass the filter media by flowing between the pleats.

Some filter elements have an external protective structure or support such as an expanded metal sleeve which fits around the outside of the filter media and protects the filter media from external impacts. There are a number of difficulties with external expanded metal sleeves, one of which is the expense of stocking various widths and heights of expanded metal external sleeves which, with some difficulty, must be sheared to very close tolerances in order to meet specification and which must be rolled to mimic a round outside diameter and then welded to that specific diameter. Another difficulty is that expanded metal has many sharp edges that cut employees and customers. An additional drawback is that the sharp edges scrape the filters and can result in filter tears which cause dusting problems in engines or other equipment which require clean air. While the filter is protected from external impacts of large objects, the occasional tear, due to the sharp edges of standard metal sleeves, is a disadvantage which results from utilizing the sleeves.

As industries become increasingly aware of efficiency, users of heavy duty dust collectors need outer wraps which are more open so as to minimize interference with air flow into the filter media. This is especially the case for filter installations in which filters are cleaned by a blast of high volume back pulse air from the clean side or inner side of the filter. The back pulse extends the life of the filters by removing, in many cases, substantially all particles and contaminants from the pleats of the filter media. In the filters with an exterior expanded metal sleeve, there is not enough open space to disperse the dust away from the pleats because the expanded metal tends to confine the dust.

SUMMARY OF THE INVENTION

It is a feature of the present invention to provide a new and improved external wrap, protective structure or support for filter elements.

In view of this feature and other features, the present invention is directed to a filter element comprising a pleated annular filter media having a hollow core and having first and second ends. Disposed within the hollow core of the filter media is a perforated tube and adhered to the first and second ends of the filter media are first and second end plates. The filter media is surrounded by a preformed metal coil having a first end and a second end.

In a further aspect of the invention, the preformed metal coil is anchored at the first and second ends thereof to the first and second ends of the filter media and, in still a further aspect of the invention, the ends of the coil are embedded in adhesive which seals the ends of the filter media and retains the end caps in place.

In still a further specific embodiment of the invention, the coil spring is not adhered or otherwise fixed to the filter media at points intermediate its ends.

The present invention also includes a method of assembling an air filter wherein wire is formed into a preformed metal coil defining an inner cylindrical space having first and second ends, into which inner cylindrical space an annular pleated filter media is inserted. A tube having perforations therein is inserted into the annular pleated filter media, either before or after filter media is inserted into the coil, and end caps are adhered over axial facing and radially extending ends of the filter media.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
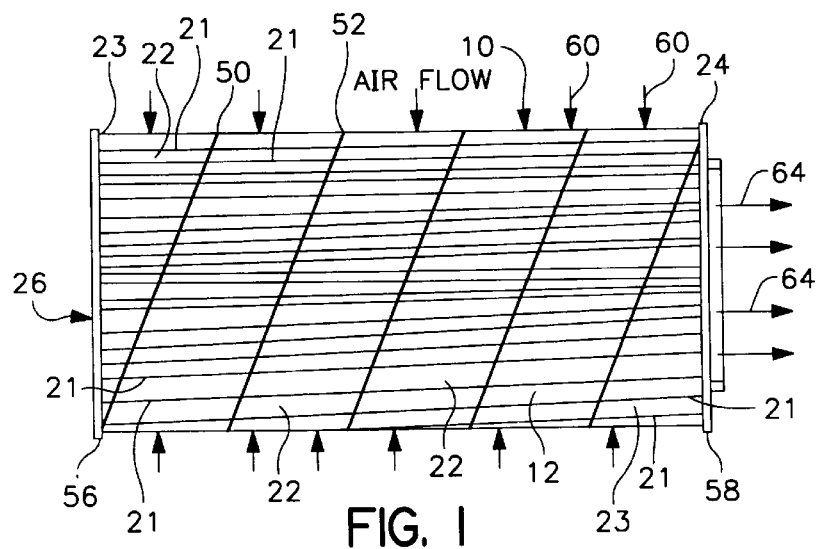
FIG. 1 is a side view of a filter element in accordance with the principles of the present invention.
Figure 2:
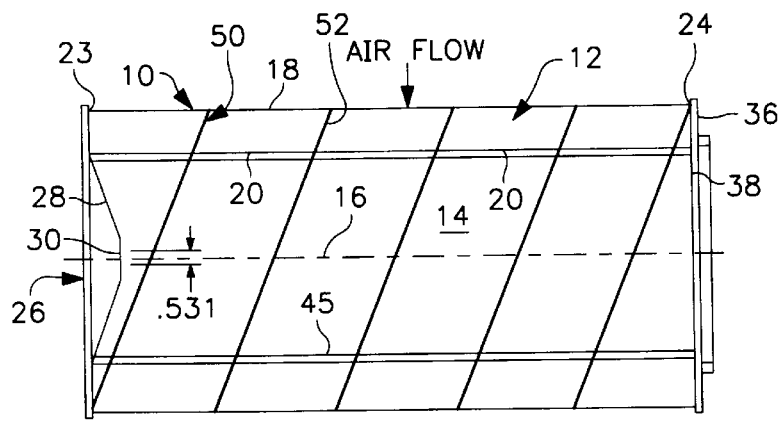
FIG. 2 is a side elevation of the air filter of FIG. 1.

Referring now to FIGS. 1–4, there is shown a filter element 10 having a filter media 12 which defines a hollow core 14 and is disposed about a longitudinal axis 16. Completed filter media 12 has an exterior filter face 18 and an interior filter face 20 (FIG. 2) defined by folds 21 of the filter element which combine with the gaps therebetween to provide the face configurations. The pleated filter media 12 has a first end 22 and a second end 24.

Figure 3:
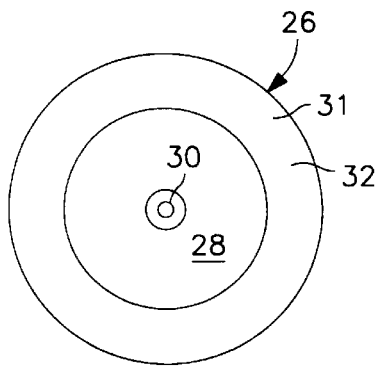
FIG. 3 is an end view of a first end of the filter element of FIGS. 1 and 2.

The first end 23 of the filter media 12 is closed by a first end cap 26. The first end cap 26 has a dished center hub 28 which projects into the hollow core 14 of the filter media 12 and has a bolt hole 30 therethrough for receiving a bolt (not shown) that extends along the axis 16 for bolting the filter element 10 to an air intake (not shown) of whatever device or facility is utilizing air cleaned by the filter element. As is seen in FIG. 3, the first end cap 26 has a dished (U-shaped in cross-section) area 31 in which an adhesive, such as plastisol, is provided so that when the first end cap 26 is placed over the first end 23 of the filter media 12, the pleats 21 of the filter media are sealed.

Figure 4:
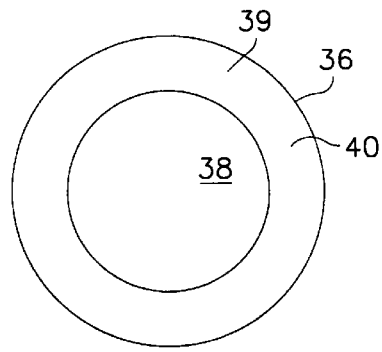
FIG. 4 is an end view of the second end of the filter element of FIGS. 1 and 2.

As is seen in FIG. 4, a second end cap 36 fits over the second end 24 of the filter media 12 and has a channel-shaped (U-shaped in cross-section) area 39 which receives plastisol 40 so that when the second end cap is placed over the second end 24 of the filter media 12, the pleats of the filter media are sealed at the second end. In order to provide internal support for the filter media 12, an expanded metal tube 45 is placed in the hollow core 14 adjacent to the inner face 20 of the pleated filter media 12.

In order to provide an external support or wrap, a preformed metal coil 50 is disposed around the external face 18 of the filter media 12. The preformed metal coil 50 is made of steel wire which is preferably round in cross-section and has a helical portion 52 which is disposed around the external face 18 of the filter media 21. The preformed metal coil 50 has a first end 54 and a second end 56, which are in the form of circular hoops as will be described further with respect to FIGS. 6–8.

As is seen in FIG. 1, in operation dirty air containing particles and contamination flows radially inward in the direction of arrows 60 through the filter media 12 into the hollow core 14 by passing through the perforations in the expanded metal tube 45. The air then exits in the direction of arrows 64 through the opening 38 in the second annular end place 36 (see also FIG. 4).

Figure 5:
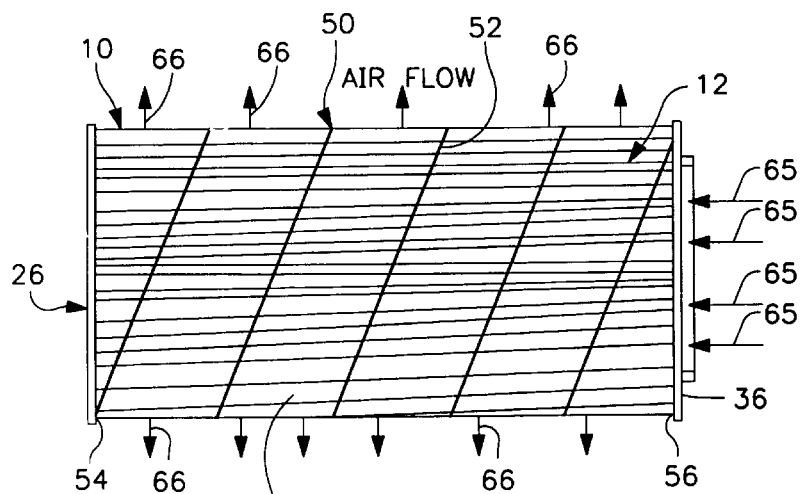
FIG. 5 is a side view of the filter element of FIGS. 1 and 2 being cleaned by a back pulse.

As is seen in FIG. 5, when it is desired to clean the filter element 10, a back pulse of clean air enters the opening 38 in the direction of arrows 64 and then passes through the filter media 12 from the hollow core 14 in the direction of arrow 66. This displaces particles and debris from the pleats of the filter media 12 and cleans the filter media so that the filter elements 10 have an extended life.

Figure 6:
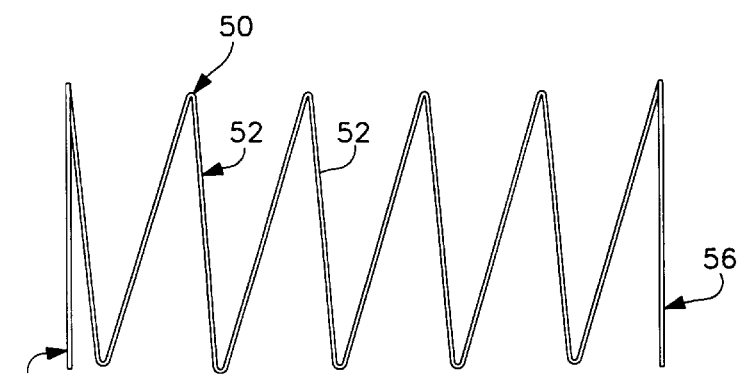
FIG. 6 is a side view of a preformed metal coil used as an external wrap for the air filter of FIGS. 1–5.
Figure 7:
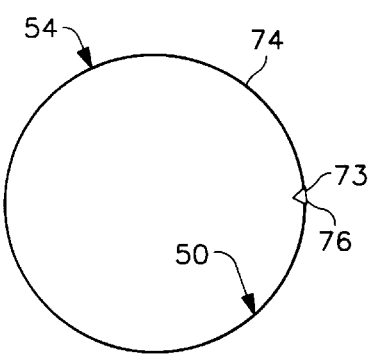
FIG. 7 is an end view of a first end of the metal coil of FIG. 6.
Figure 8:
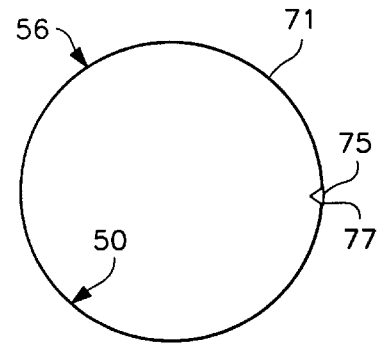
FIG. 8 is an end view of a second end of the metal coil of FIG. 6.

Referring now to FIGS. 6–8, it is seen that the preformed metal coil 50 has first and second ends 54 and 56 which are in the form of circular hoops 70 and 71. As is seen in FIGS. 7 and 8, the circular hoops 70 and 71 are in a single plane and are formed by welding ends 73 and 75 to the preformed metal coil 50 at locations 76 and 77. The hoops 70 and 71 are bonded to the ends 23 and 24 of the filter media 12 by the adhesive 32 and 40 which holds end caps 26 and 36 in place. The helical portion 52 of the preformed metal coil 50 is not adhered, bonded or otherwise attached to the surfaces of the pleat folds 21 which define the external face 18 of the filter media.

An advantage of using the preformed metal coil 50 is that the filter media 12 is supported during the reverse pulse operation of FIG. 5. Since the preformed metal coil 52 is not adhered to the filter media and has a round cross-section, the areas of contact between the preformed metal coil and the filter media have minimal stress, while the areas of most contact are greatly expanded when compared to the prior art arrangement of surrounding the filter media with an expanded metal screen. Accordingly, when the filter element 10 is pulsed as in FIG. 5, there is minimal interference with material being blown off the dirty exterior face 18 of the filter media 12.

By using the preformed metal coil, manufacturing advantages result. The preformed metal wire coil 50 is produced by a wire coil machine at the front of the production line. The wire coil machine is programmed to produce the wire coil of a selected length and diameter and simply spits out the selected spring design and welds the ends 73 and 75 with the welds 76 and 77 of FIGS. 7 and 8. The assemblers drop the pleated filter media 12 into the inner space provided by the preformed metal coil 50 and the end caps 26 and 36 with the end cap adhesive 32 and 40 are installed and heat cured to complete the filter element 10. Preferably, the end caps 26 and 36 are installed by placing the filter media 12 with the preformed metal coil 50 therearound on one of the end caps with the axis 16 extending vertically. This end cap is then bonded to the end of the filter media by passing the filter media through a curing oven. The filter media 12 having the preformed metal coil 50 therearound is then turned upside down on the other end cap with the hoop in the adhesive of the second end cap and the assembly is then passed through a second curing oven or again through the first curing oven to adhere the second end cap. This completes the assembly of the filter element 10 with the hoops 70 and 72 bonded in the adhesive 32 and 40 at the ends 22 and 24 of the pleated filter media 12.

While the filter element 10 is of particular use with installations in which back pulse filter cleaning is practiced, the filter element may be used in any other arrangement in which an external wrap, protective structure or support is utilized. If it is desired to increase the amount of protection, then the pitch of the helix is modified to increase the amount of turns necessary. If less wrap is needed, then the number of turns is reduced.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A filter element comprising:

a pleated annular filter media having a hollow core, the filter media having a first and a second end;

a perforated tube disposed within the hollow core;

a first end plate adhered by adhesive to the first end of the filter media;

a second end plate adhered by adhesive to the second end of the filter media; and a preformed metal coil disposed around the exterior of the filter media for reinforcing the filter media during back pulsing, the preformed metal coil having a first axial end and a second axial end the first and second axial ends being formed as hoops which are secured at the ends of the filter media by an adhesive.

2. The filter element of claim 1, wherein the adhesive that secures the circular hoops is the same adhesive that adheres the end caps to the ends of the filter media.

3. The filter of claim 1, wherein the circular hoops are formed by welding the ends of the preformed metal coils to the coils.

4. The filter of claim 1, wherein the first end cap is closed and the second end cap is annular.

5. The filter of claim 1, wherein the preformed metal coil is made of steel.

6. The filter of claim 1, wherein the coil is only anchored to the filter at the ends of the coil, the coil being unadhered to the filter media.

7. A method of assembling an air filter comprising:

forming wire into a preformed metal coil defining an inner cylindrical space and having first and second ends;

inserting an annular pleated filter media having first and second ends into the inner cylindrical space of the preformed metal coil;

inserting a tube having perforations into the annular pleated filter media;

placing end caps having adhesive thereon onto the ends of the filter media with the ends of the coil embedded in the adhesive to form a filter assembly; and heating the assembly to cure the adhesive.

8. The method of claim 7, wherein one of the end caps is placed on the filter with the axis of the filter extending vertically and the filter resting on the end cap while the filter is heated, and then the other end cap is placed on the filter with the axis of the filter extending vertically, while the filter is resting on the other end cap as the filter is heated.

* * * * *